March 19, 1968 W. D. KENDALL 3,373,744
BODY CAVITY IRRIGATING APPARATUS HAVING A MEDICAMENT ADDITIVE
CHAMBER WITH MEANS TO INDUCE A MIXING BUBBLE
Filed April 2, 1965 2 Sheets-Sheet 1
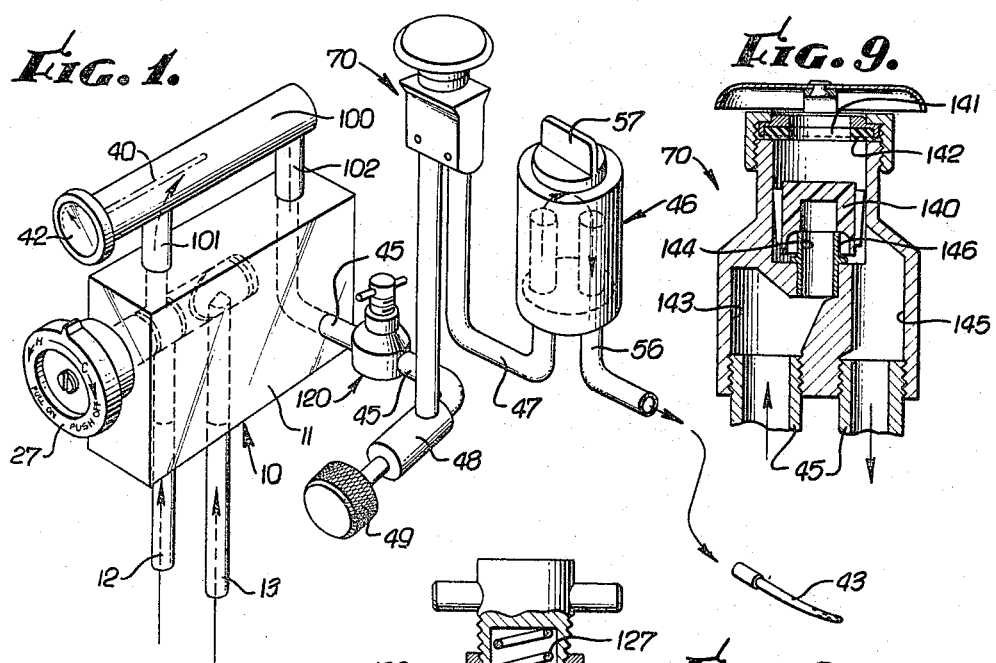
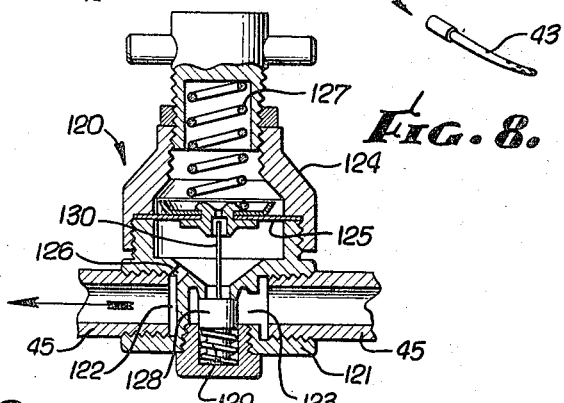
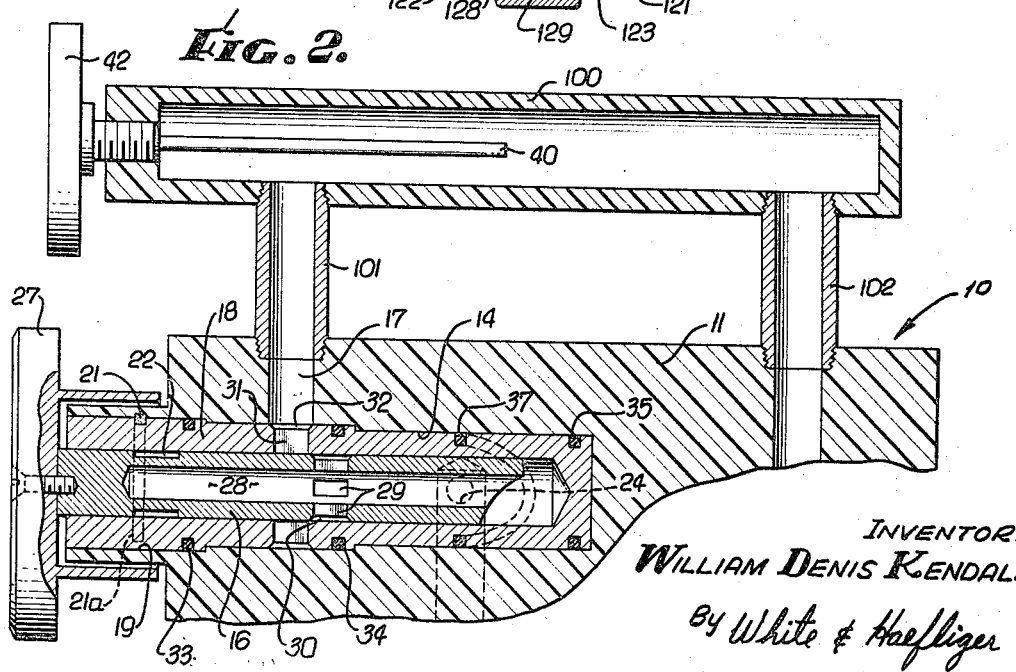
INVENTOR.
WILLIAM DENIS KENDALL
By White & Haefliger
ATTORNEYS.

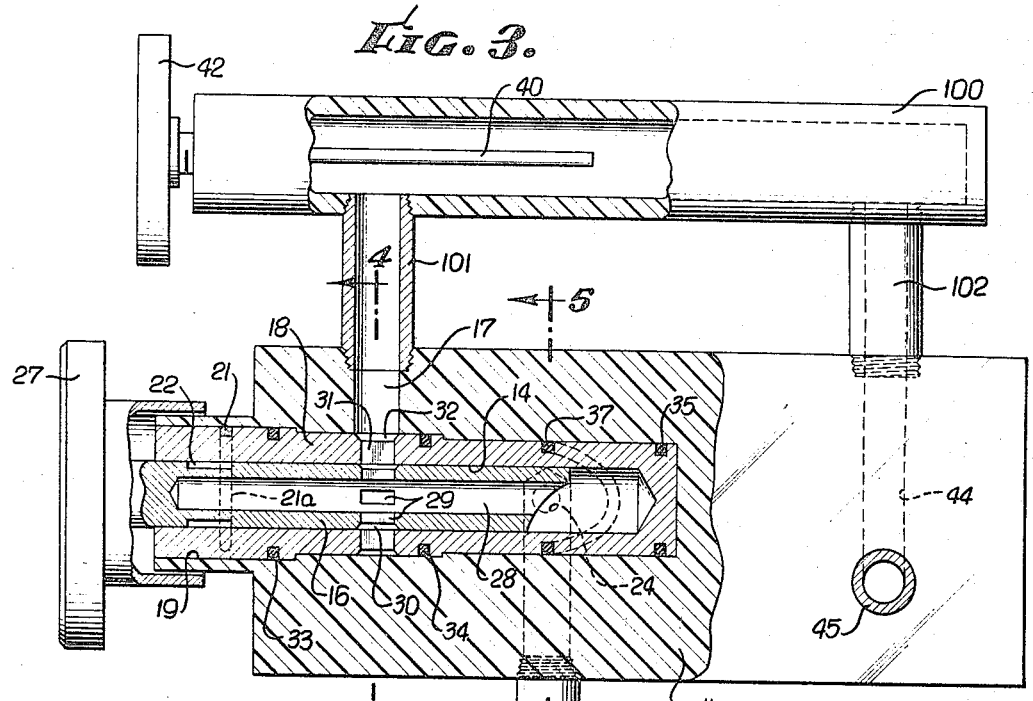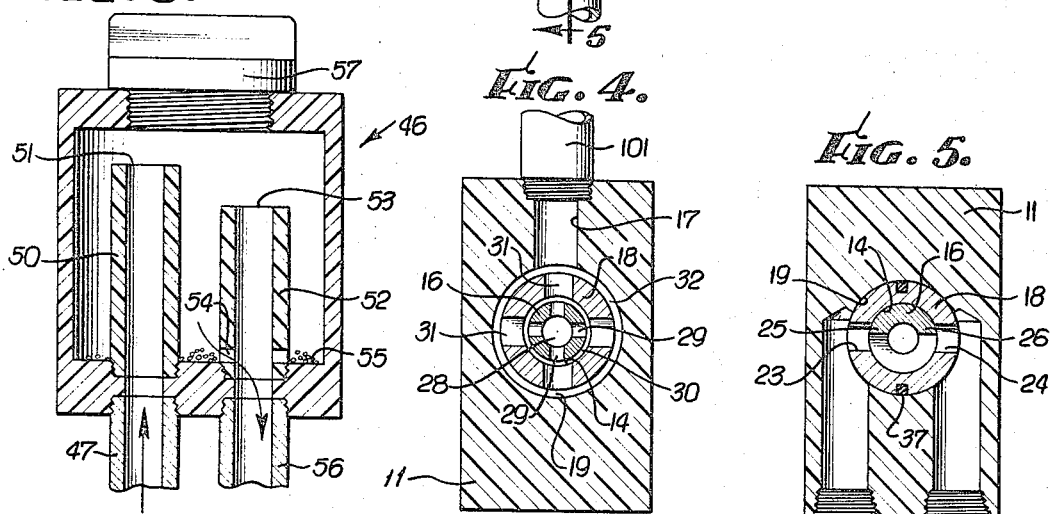

United States Patent Office 3,373,744
Patented Mar. 19, 1968

3,373,744
BODY CAVITY IRRIGATING APPARATUS HAVING A MEDICAMENT ADDITIVE CHAMBER WITH MEANS TO INDUCE A MIXING BUBBLE
William Denis Kendall, Los Angeles, Calif., assignor to Dynapower Systems Corporation of California, Santa Monica, Calif., a corporation of California
Continuation-in-part of application Ser. No. 403,803, Oct. 14, 1964. This application Apr. 2, 1965, Ser. No. 445,045
4 Claims. (Cl. 128—229)

ABSTRACT OF THE DISCLOSURE

The disclosed apparatus concerns enema or douche application wherein discharge water temperature and treatment additive entrainment are beneficially controlled.

This application is a continuation-in-part of my earlier application, "Body Cavity Irrigating Apparatus," filed Oct. 14, 1964, Ser. No. 403,803, now abandoned.

This invention relates generally to hygienic equipment, and particularly of the type used to effect and control the flow of liquid to an irrigating instrumentality.

At the present time equipment of the above type, as for example used for enema or douche applications, generally lacks certain unusual advantages and features the provision of which the present invention has for its major objects. These unusual advantages and features include improvements in controllable release or communication of treatment additive to the temperature selected discharge flow, improvements in the combining of flow control and temperature measure and additive mixing chambers, and the utilization of these and other advantages and features in equipment of unusually effective and simple construction.

In its basic system aspect, the invention concerns the provision of hygienic equipment comprising a novel combination of elements functioning in a highly effective manner and resulting in an unusual combination of benefits or results. These include controlled mixing of hot and cold water to desired temperature, effective pressure regulation and safety control and communication of treating additive to the water flow all in such simple and effective manner as to result in a highly useful and safe enema and douche treatment apparatus.

In addition, the hygienic equipment is concerned with improvements to apparatus that includes a mixing chamber having hot and cold water inlets and an outlet, main control valve means movable in a first mode in communication with the mixing chamber to adjust the relative hot and cold water inlet flow thereto thereby to control the temperature of water discharging at the outlet, the valve also being movable in a second mode to control the rate of the discharge at the outlet, and other means to conduct the discharge flow to a human body cavity irrigating instrumentality. Prior art concerning hot and cold water inlet control, temperature indication, and supply of additive to the water is exemplified by U.S. Patent 1,970,013 to Mahmourian. In accordance with one aspect of the present invention, the equipment is improved by providing means to communicate a treating additive to the discharge flow for conduction thereby to said instrumentality, such means including a closed chamber having top interior and bottom interior surfaces and inlet and outlet openings spaced at levels intermediate said surfaces to induce formation of an air bubble in the upper portion of the chamber to promote mixing of said additive with the water passing through the chamber. More specifically, the air bubble affords such a flow pattern of water in the chamber as to provide for desired mixing, solution, and slow release of comminuted medicinal additive to the water leaving the chamber.

More specifically, a water entrance duct is incorporated in the closed mixing chamber to terminate at an upper level therein forming the inlet opening, a water discharge duct is also located in the mixing chamber to terminate at a lower elevation therein forming the outlet opening, and the discharge duct has an opening through the side thereof proximate the bottom interior surface of the mixing chamber to drain water standing in the chamber when the control valve is moved to shut off the water flow.

Additional features include the spacing of the control valve chamber from a temperature sensing chamber, and also the spacing of the treatment additive chamber therefrom, while still maintaining series connection of such chamber, leading to simplified construction and fabrication.

These and other objects and advantages of the invention, as well as the details of an illustrative embodiment, will be more fully understood from the following detailed description of the drawings, in which:

FIG. 1 is a perspective overall showing of a preferred embodiment of the equipment;

FIGS. 2 and 3 are enlarged vertical sections taken through the flow control and temperature sensing chambers;

FIG. 4 is a section taken on line 4—4 of FIG. 3;

FIG. 5 is a section taken on line 5—5 of FIG. 3;

FIG. 6 is a vertical section taken through the treatment additive chamber;

FIG. 7 is a view like FIG. 6. but showing the treatment additive chamber in operation; and FIGS. 8 and 9 respectively show cross-sections taken through a representative pressure regulator and a representative vacuum breaker.

Referring now to the details in the drawings, a hot and cold water mixing chamber is generally indicated at 10 as formed by body or block 11, and having hot and cold water inlets 12 and 13 from conventional plumbing sources. Movable in communication with the mixing chamber, as for example in chamber bore 14, is what may be generally characterized as main control valve means. An example is the tubular valving stem or inner cartridge 16, which is movable in a first mode such as rotation, to adjust the relative hot and cold water inlet flow to the mixing chamber thereby to control the temperature of water discharging at the mixing chamber outlet 17 in body 11. Stem 16 is also movable in a second mode, such as axially in and out, to control the rate of the discharge at the outlet 17, rate control typically being simply "on" or "off" flow.

More specifically, the mixing chamber 10 may include an outer cartridge or sleeve 18 retained within bore 19 of the body 11 as by the arcuate stop ring 21, the legs 21a of which are received in grooving 22 formed in the inner stem 16 to limit axial movement thereof, as is clear from FIGS. 2 and 3. Cartridges 18 and 16 may be metallic and body 11 non-metallic in a typical installation.

Referring to FIG. 5, hot and cold water inlets 12 and 13 communicate through side ports 23 and 24 in cartridge 18 with the interior thereof, those ports typically being blanked by the wall portions 25 and 26 of the inner cartridge 16 when the latter is in closed or off position. FIG. 2 indicates that the exposed manual control knob 27 of the main valving may simply be pushed in, or to the right, to effect such close off of the flow. When it is desired to start the flow, knob 27 is pulled out, or to the left in FIG. 3, so that wall portions 25 and 26 of inner cartridge 16 then at least partly uncover the inlet ports 23 and 24. Hot and cold water flow is then established to enter the bore 28 of inner cartridge 16. If knob 27 is turned in one rotary direction, port 23 is uncovered to greater extent and port 24 covered to greater extent, leading to warmer discharge flow at outlet 17, whereas if knob 27 is turned in the opposite rotary direction, port 23 is covered to greater extent and port 24 uncovered to greater extent, leading to cooler discharge flow at outlet 17.

Communication of flow from the bore 28 to outlet 17 is had via side ports 29 and annular grooving 30 in inner cartridge 16, and ports 31 and annular grooving 32 in outer cartridge 18, as is clear from FIG. 4. Annular seals 33, 34 and 35 seal off between the outer cartridge and body bore 19. An elliptical seal 37 about cartridge 18 seals off between the hot and cold water inlets. As a result, leakage to the exterior of body 11 is prevented and at the same time the desired control of hot and cold water flow is established in the unique system environment.

Means to pass the discharge flow from chamber 10 includes a second chamber 100 spaced from chamber 10 and connected thereto by piping 101 and 102. A discharge water temperature sensing element, such as element 40 is exposed to the discharge flow passing through chamber 100, and a temperature indicating meter 42 is exposed at the exterior of the mixing chamber. As a result, the user may very accurately control the temperature of the flow to the irrigating instrument, by watching meter 42 while turning knob 27. From chamber 100 the discharge flow returns via piping 102 to a duct 44 in body 11.

Coming now to an improvement with which this invention is particularly concerned, a treating additive chamber 46 is connected in series with piping 45 and 47, controlled by valve 48 having a knob 49, to communicate treating additive to the discharge flow for conduction to instrument 43. The latter may take the form of a douche or enema applicator. Chamber 46, which is typically transparent for viewing of the amount of comminuted form medicinal substance therein, contains an upright water entrance duct 50 terminating at an upper level therein below upper interior surface 60a to form an inlet opening 51. The chamber also contains an upright water discharge duct 52 terminating at a lower level therein to form an outlet opening 53. Duct 52 also has an opening 54 through the side thereof and proximate the bottom interior surface 55 of the chamber to drain water standing in the chamber when the control valving is moved in chamber 10 to stop water flow through the equipment. Such drainage passes through the flexible line 56 to the applicator 43.

In operation, the top closure 57 of chamber 46 is removed as by unscrewing, and a comminuted medicinal substance is inserted as by pouring into chamber 46, to lie on bottom surface 55. The control valve knob 27 is then pulled out to FIG. 3 position while valve 48 remains open to start water flowing through the system, knob 27 being adjusted to achieve temperature control. As the water passes through chamber 46, an air bubble forms as indicated at 58 in FIG. 7, above the ducts 50 and 52, and defining a turbulent interface 59 with water 60 mixing with the additive in the chamber below the interface. Promotion of such mixing prior to exit of the water from the chamber and delayed release of the additive to the outward flowing water is thereby achieved, inasmuch as the bulk of the water in the chamber is kept below the outlet opening 53 by the air bubble. In this regard, the solid particles of additive tend to flow about in the chamber 46 above outlet 54, and bubble 58 also tends to keep them from rising to the upper interior of the chamber over the outlet opening, whereby the particles are kept in the chamber for dissolution into the water flowing therethrough. A typical additive is that known commercially as V. A. Douche Powder, supplied by Norcliff Labs., Fairfield, Conn.

Another feature of the invention is the simplified construction and interconnection of the chambers 10, 100 and 46 in mutually spaced apart relation. Thus piping 101 and 102 mounts chamber 100 above chamber 10, and rigid metallic piping 45 and 47 holds chambers 10 and 46 in sideward spaced relation. As a result, the typically transparent plastic chamber may be formed separately and easily interconnected for usage in the system.

A pressure regulator 120 may be connected in series with line 45 for regulating the flow of controlled temperature water to a predetermined pressure or pressure range, as for example around 1 p.s.i. A typical regulator 120 is shown in FIG. 8 to include a body 121 having outlet and inlet ports 122 and 123 connected in series with line 45. Body 121 and cap 124 form a chamber receiving a diaphragm 125 to one side of which outlet pressure is communicated via port 126. The opposite side of the diaphragm is spring urged at 127 in a direction tending to unseat a regulator valve member 128, the latter being spring urged at 129 and having stem connection at 130 to the member 128. Accordingly, as the outlet pressure increases, the diaphragm is moved up to effect a reduction in the opening of member 128, and vice versa.

A standard vacuum breaking valve unit 70, as for example is made by Sloan Valve Company of Chicago, Ill., may be connected in series with line 45 downstream of regulator 120 and located above the water level 59 in the additive chamber 46, to admit air into the line 45 in the event a vacuum develops in that line. Referring to FIG. 9, normally a safety valve part 140 is displaced up to seat at 142 and seals off the air inlet (or water outlet) 141. Water then flows through the unit via passage extents 143, 144 and 145. Passage extent 144 is formed by a tubular seat 146 for the safety valve part 140. Should a vacuum, i.e., suction, develop in line 45 upstream of unit 70, it will be communicated to passage extent 143, and valve part 140 will drop and seal off on seat 146. Air inlet (or water outlet) 141 will then be open to pass any back-up water pressure developing in line 45 downstream of unit 140, and communicated to passage extent 145.

I claim:

1. In hygienic equipment of the character described, comprising a mixing chamber having hot and cold water inlets and an outlet, main control valve means movable in a first mode in communication with said chamber to adjust the relative hot and cold water inlet flow thereto thereby to control the temperature of water discharging at said outlet, the valve means also being movable in a second mode to control the rate of said discharge at said outlet, the control valve means including a manual control movable in both said modes and exposed at the exterior of said mixing chamber, and flow temperature indicating means including a discharge temperature sensing element exposed to said discharge flow and a temperature indicating meter, and other means to conduct said discharge flow to a human body cavity irrigating instrumentality and to communicate a treating additive to said discharge flow for conduction thereby to said instrumentality, said last named means including a closed chamber having top interior and bottom interior surfaces and inlet and outlet openings spaced at levels intermediate said surfaces to induce formation of an air bubble in the upper portion of the chamber to promote mixing of said additive with the water passing through the chamber, a water entrance duct in said closed chamber terminating at an upper level therein to form said inlet opening, a water discharge duct in said closed chamber terminating at a low level therein to form said outlet opening, and said discharge duct having an opening through the side thereof proximate the bottom interior surface of the chamber to drain water standing in said chamber when said valve means is moved in said second mode to stop the water flow through said equipment.

2. In hygienic equipment of the character described, comprising a first chamber having hot and cold water inlets and and outlet, a main control valve rotatable in said chamber to adjust the relative hot and cold water inlet flow thereto thereby to control the temperature of water discharging at said outlet, the control valve also being movable axially in said chamber between flow blocking and flow passing positions, and means to pass said discharge flow to a body cavity irrigating instrumentality, said means including a second chamber spaced from said first chamber, a temperature sensing element in said second chamber and a temperature indicating meter exposed at the exterior of said second chamber, the improvement which comprises a closed treating additive chamber spaced from a connected in series with said second chamber to communicate treating additive to said discharge flow for conduction thereby to said instrumentality, said treating additive chamber having top interior and bottom interior surfaces and inlet and outlet openings spaced at levels intermediate said surface to induce formation of an air bubble in the upper portion of the chamber to promote mixing of said additive with the water passing through the chamber, a water entrance duct in said closed chamber terminating at an upper level therein to form said inlet opening, a water discharge duct in said closed chamber terminating at a lower level therein to form said outlet opening, and said discharge duct having an opening through the side thereof proximate the bottom interior surface of the chamber to drain water standing in said chamber when said valve means is moved in said second mode to stop the water flow through said equipment.

3. The improvement as defined in claim 2 in which the closed chamber includes a removable top closure defining said top interior surface, and including rigid piping interconnecting and holding first chamber and said treating additive chamber in spaced apart relation, said piping passing the flow from said second chamber to said treating additive chamber.

4. The improvement as defined in claim 2 including a douche instrumentality connected in series with said water discharge duct in said treating additive chamber.

References Cited

UNITED STATES PATENTS

| | | | |
|---|---|---|---|
| 1,818,978 | 8/1931 | Honsaker | 128—227 |
| 2,257,072 | 9/1941 | Coombs | 128—227 |
| 2,313,805 | 3/1943 | Crawford et al. | 128—227 |
| 3,023,750 | 3/1962 | Baron | 128—214 |
| 3,044,465 | 7/1962 | Anderson Et al. | 128—230 |
| 3,103,231 | 9/1963 | Moen | 137—625.17 XR |
| 3,170,488 | 2/1965 | Manoogian | 137—625.17 |

FOREIGN PATENTS

| | | |
|---|---|---|
| 777,935 | 12/1934 | France. |
| 104,534 | 5/1942 | Sweden. |

RICHARD A. GAUDET, *Primary Examiner.*

R. L. FRINKS, *Assistant Examiner.*